S. D. SHEPPERD.
ROLLER COTTON GIN.
APPLICATION FILED JULY 19, 1911.
1,074,534.
Patented Sept. 30, 1913.
5 SHEETS—SHEET 5.
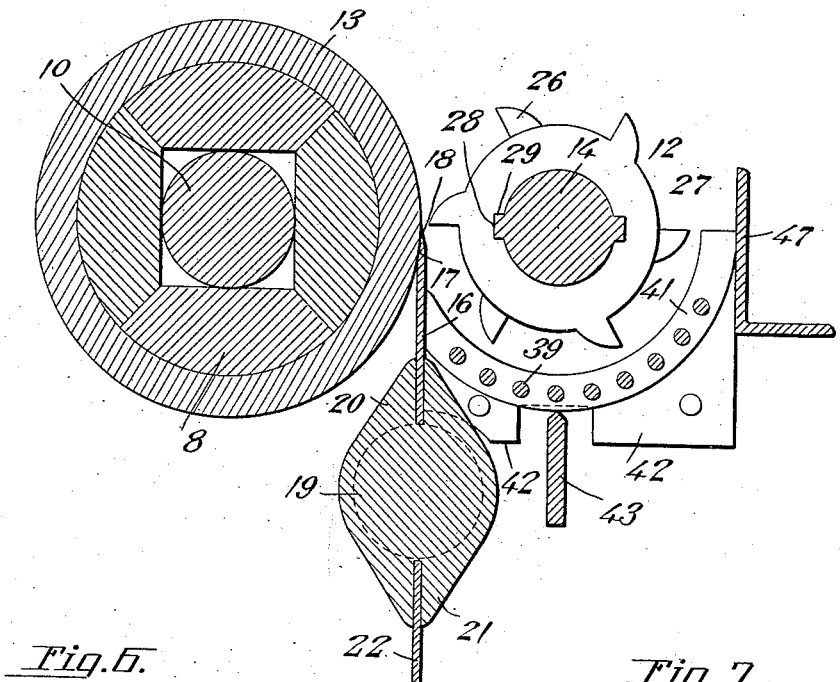
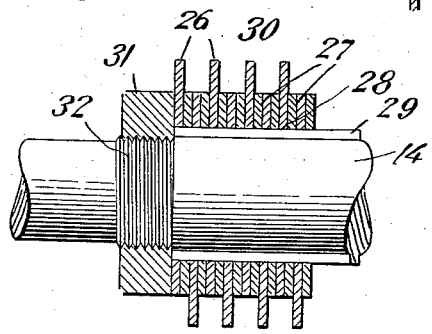
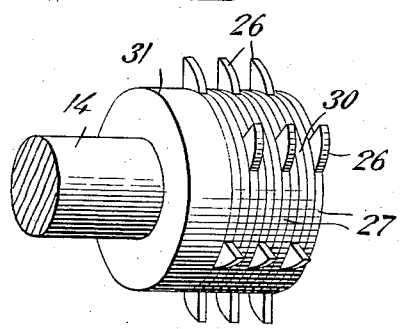
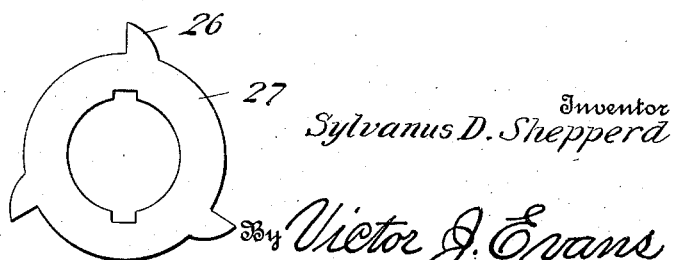

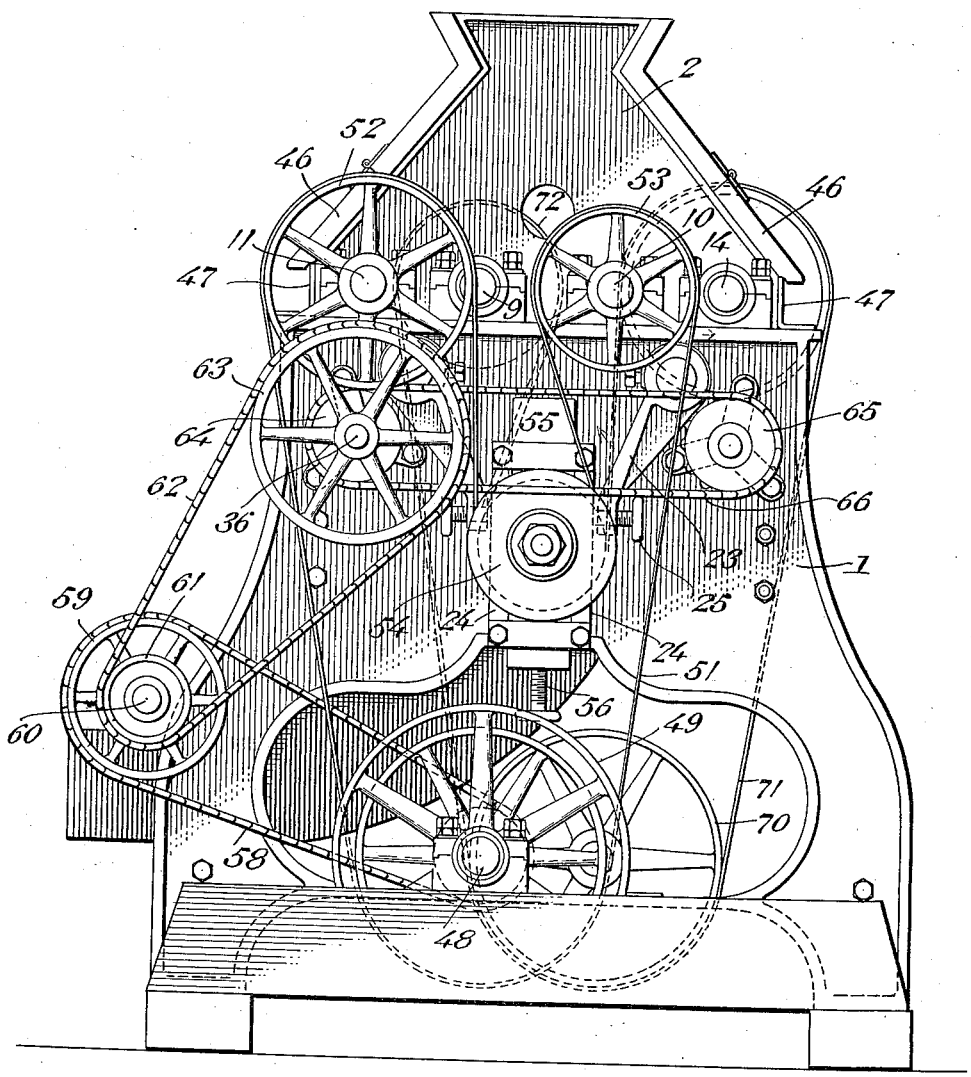

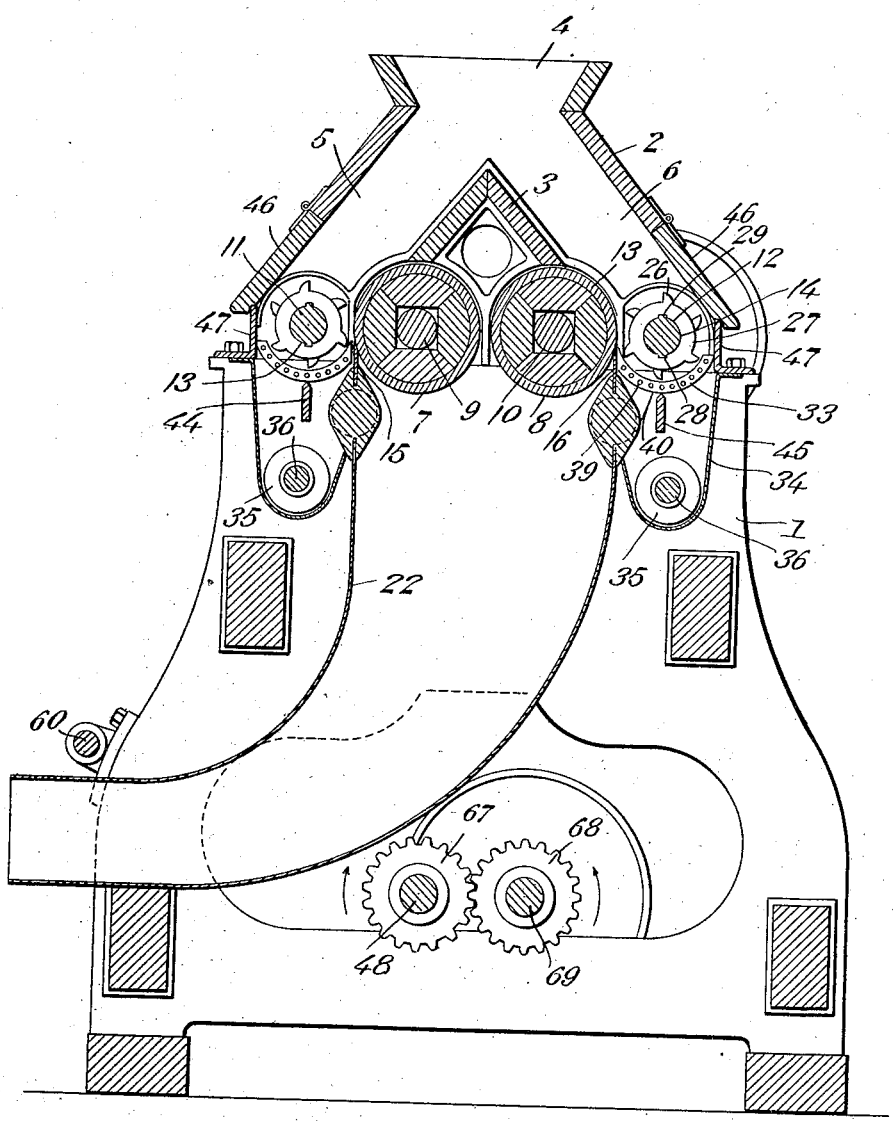

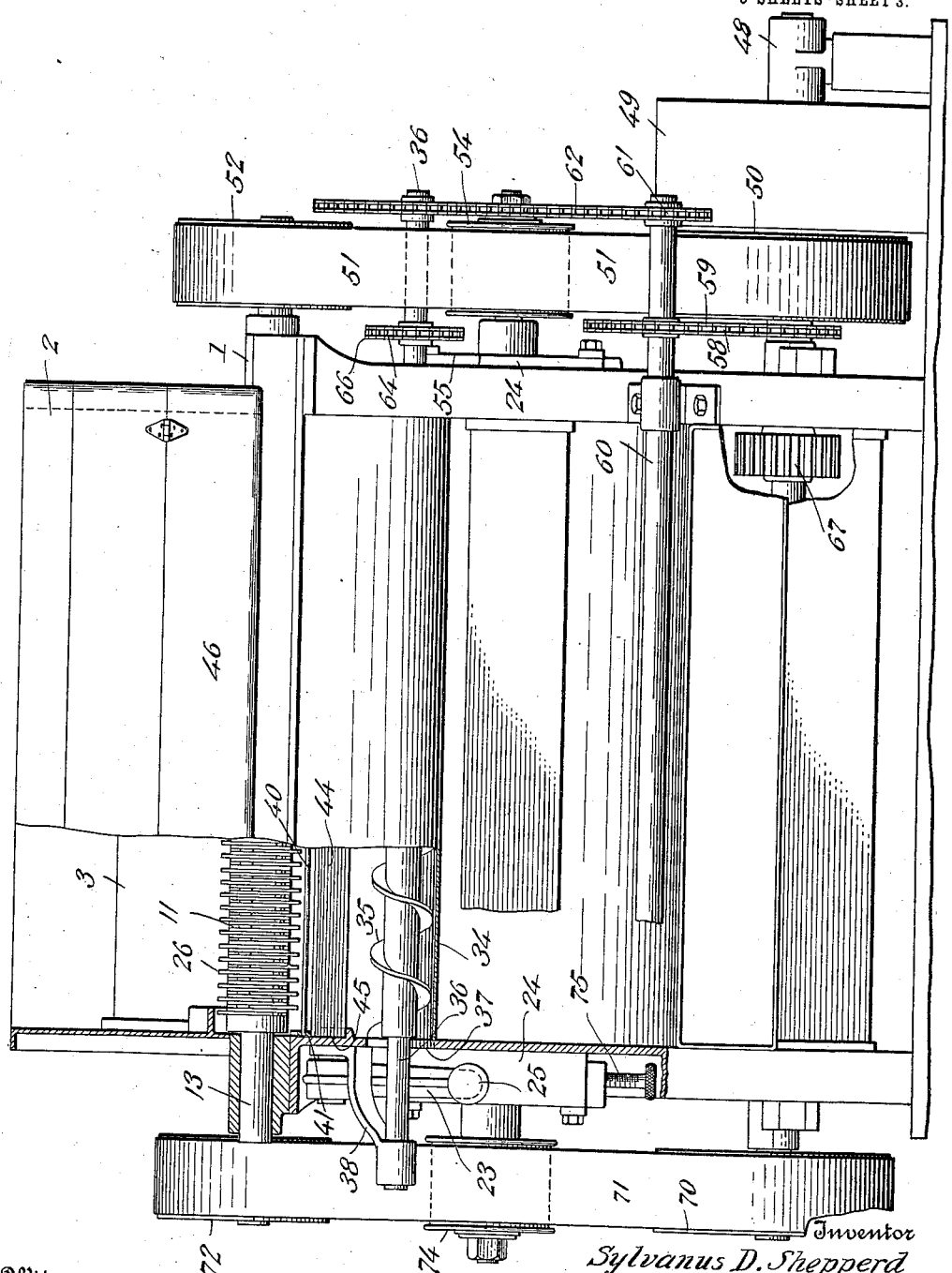

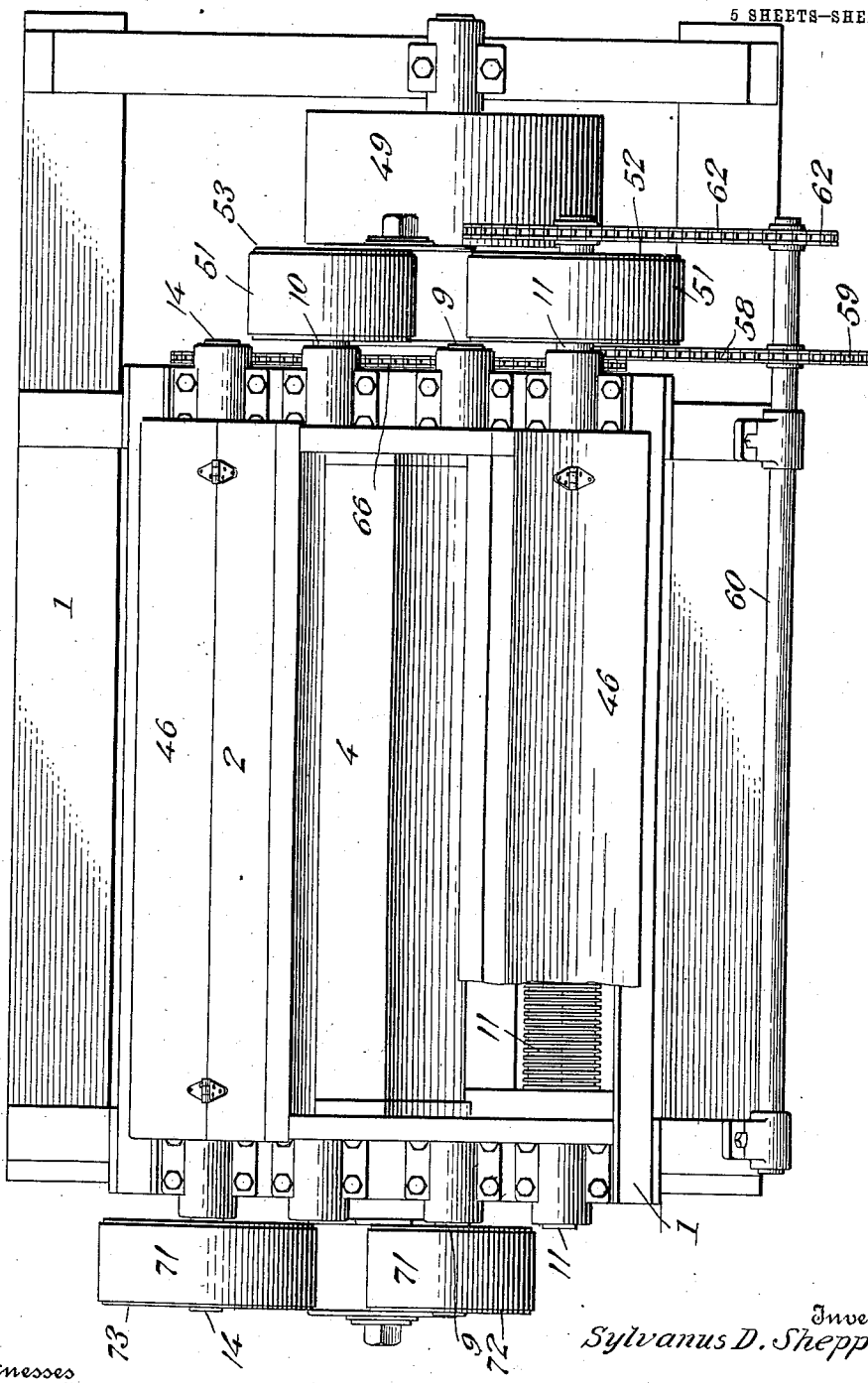

UNITED STATES PATENT OFFICE.

SYLVANUS D. SHEPPERD, OF NEWARK, NEW JERSEY.

ROLLER COTTON-GIN.

1,074,534.  Specification of Letters Patent.  Patented Sept. 30, 1913.

Application filed July 19, 1911.  Serial No. 639,347.

*To all whom it may concern:*

Be it known that I, SYLVANUS D. SHEPPERD, a citizen of the United States, residing at Newark, in the county of Essex and State of New Jersey, have invented new and useful Improvements in Roller Cotton-Gins, of which the following is a specification.

This invention relates to roller cotton gins, the primary object of the invention being to provide a gin of this type embodying a novel construction and arrangement of ginning roll, doctor blade and rotary knocker or tappet roll, whereby the cotton may be rapidly, economically and efficiently ginned without injury to the fiber or rendering the seed unfit for commercial use.

A further object of the invention is to provide a construction of parts whereby the necessity of "combing" the cotton for the extraction of the seed is avoided, and whereby the seed will be loosened up by the doctor blade and freed from the cotton by the tappet action of a toothed knocker roll, thus preventing the fiber from being torn and enabling long and short fiber to be ginned with equal efficiency.

A still further object of the invention is to provide simple and effective means for adjusting the doctor blade with relation to the ginning roll and for collecting and discharging the lint and seed, and also to provide a simple and effective construction of tappet roll for the purpose set forth.

A still further object of the invention is to provide a double-gin of the indicated type wherein the parts are compactly arranged and a simple and effective organization of driving mechanism employed for operating the several parts.

With these and other objects in view, the invention consists of the novel features of construction, combination and arrangement of parts hereinafter fully described and claimed, reference being had to the accompanying drawings, in which:—

Figure 1 is a front end elevation of a roller cotton gin embodying my invention. Fig. 2 is a vertical transverse section of the same. Fig. 3 is a side elevation of the gin with parts broken away and in section. Fig. 4 is a top plan view of the gin with a portion of the hopper broken away. Fig. 5 is a transverse section on an enlarged scale through one of the sets of ginning devices. Fig. 6 is a longitudinal section through a portion of one of the tappet rolls. Fig. 7 is a perspective view of the same. Fig. 8 is a view of one of the toothed disks of the tappet roll.

Referring to the drawings, 1 designates the frame of the gin, which may be of suitable form and construction, and which includes a top portion 2, forming a combined hopper and ginning chamber, in which latter is arranged a central inverted V-shaped deflector 3 arranged below the mouth 4 of the hopper and sub-dividing the ginning chamber to provide feed passages 5 and 6 leading to the respective sets of ginning devices.

The ginning devices comprise a pair of ginning rolls 7 and 8 mounted upon shafts 9 and 10, respectively, and a coöperating pair of rotary tappet or knocker rolls 11 and 12 mounted upon shafts 13 and 14, respectively, the construction and arrangement of parts disclosed providing a double gin having duplicate sets of ginning devices, although any number of sets of ginning devices may, in practice, be employed.

Each ginning roll is provided with a fiber-grasping surface 13 of felt or other suitable material, and said rolls are arranged in close proximity to each other with their shafts disposed in the same horizontal plane and in parallel relation to each other. The tappet or knocker rolls 11 and 12 are arranged on the outer sides of the ginning rolls and at the lower ends of the passages 5 and 6, and are adapted to rotate in close proximity to their respective coacting ginning rolls and have their shafts arranged in parallel relation to each other and to the shafts of the ginning roll and in the same horizontal plane.

The ginning rolls are disposed respectively below the lower edges of the downwardly-diverging side walls of the deflector 3, which terminate about in vertical alinement with the shafts of the rolls, whereby approximately one-fourth of the acting surface of each roll will be exposed at the base of the passage 5 or 6, so that the cotton feeding downward through the passages 5 and 6 will first come in contact with the surfaces of the ginning rolls before being acted upon by the knocker rolls and doctor blades, in order that the cotton may be caused to cling to the ginning rolls for an effective ginning action, as hereinafter described.

Arranged for coöperation with the respective ginning rolls and knocker rolls are vertically disposed doctor blades 15 and 16 having hollow ground upper edges extending the full length of the ginning rolls and providing concave surfaces 17 to fit against and conform to the contour of the ginning rolls and beveled stripping edges 18 for effecting a cleanly separation of the seed from the cotton fiber. The doctor blades are made of spring metal and are supported by parallel longitudinally-extending rock shafts 19, each provided with upwardly and downwardly projecting slotted flanges 20 and 21. The lower edges of the blades 15 and 16 fit within the slots in the flanges 20, and are thus made readily insertible and removable for renewal and repairs. The slots in the resilient flanges 21 receive and engage the upper edges of the side walls of a sheet metal chute 22, into which the delinted cotton from the ginning rolls falls, said chute extending laterally at its lower end beyond one of the sides of the frame for the delivery of the cotton into a suitable receptacle.

The ginning rolls 7 and 8 rotate in opposite directions, namely, outwardly and downwardly, while the knocker or tappet rolls 11 and 12 rotate downwardly and inwardly, for proper coaction with the respective ginning rolls and doctor blades, the elements of the sets of ginning devices being arranged and operating in the manner described in order to secure compactness of structure with a high degree of rapidity and efficiency of action in the ginning process. The doctor blades normally bear through their inherent spring action against the surfaces of the ginning rolls with just sufficient force to maintain their proper relationship to the rolls, while permitting of the passage of the delinted cotton around with the rolls and past the edges of the blades, which edges of the blades operate to arrest the passage of the seed and to loosen up the seed for release, so that the seed will be freed from the cotton by the action of the teeth of the knocker or tappet rolls, as hereinafter fully described. The doctor blades are adapted also, by their resiliency, to maintain proper contact with the ginning rolls, as their surfaces wear away by friction, thus obviating the necessity of adjusting the blades to compensate for wear at frequent intervals. The blades are adapted to be moved outward and away from the rolls by the inward pressure of resilient walls of the chute 22 on the slotted flanges 21 which they engage, said flanges serving as cranks by which the pressure of the chute walls operates to turn the rock shafts in an outward direction, the flexibility of such walls, however, permitting ready adjustment of the blades to the working pressure required. In order to provide for the adjustment of each doctor blade to regulate its pressure upon the coacting ginning roll the forward outwardly projecting end of each rock shaft 19 is provided with a crank arm 23, the lower or free ends of the crank arms connected with the two rock shafts being disposed in parallel relation to a pair of guide flanges 24 on the front wall of the frame and provided with adjustable contact screws 25 to engage said flanges. The pressure of the chute walls and ginning rolls on the doctor blades, which tends to turn the rock shafts outwardly, serves to maintain the screws in contact with the flanges, but by adjusting said screws, the rock shafts may be turned inwardly to the desired extent to cause the doctor blades to bear with greater or less pressure on the ginning rolls, as will be readily understood.

Each tappet or knocker roll is provided with parallel longitudinal rows of knocker teeth or tappets 26, which, in the rotation of the roll, come in contact with the seed partially separated from the cotton by the doctor blade and strike the fibers of the cotton and thus free the seed therefrom, by which rapid separation of the seed may be effected without crushing the seed or otherwise injuring the same. These teeth are preferably formed upon disks 27 having notches or keyways 28 to receive and engage longitudinal keys or ribs 29 on the shaft of the roll, by which the disks are held from rotation and are properly set with relation to each other. The disks are separated from each other by spacing disks or washers 30 and are clamped in position by nuts 31 engaging threaded portions 32 of the shaft, the teeth of the disks alternating in arrangement with the teeth of adjacent disks, so that longitudinal rows of teeth, disposed in parallel relation with each other, are provided around the circumference of the roll at equal circumferential distances from each other. By this construction and arrangement of the parts, the cotton is not only allowed to spread out and adjust itself to the exposed surface of the ginning roll, and the seed to be partially separated by the doctor blade and finally freed by the knocker action of the tappet roll, but the necessity for combing the cotton in the usual manner is avoided, thus preventing tearing of the cotton in the ginning operation, and enabling both short and long cotton to be ginned with equal efficiency. At the same time the seed are separated without crushing or other injury, so that their value as a commercial product will not be diminished.

As before described, the delinted cotton drops from the ginning rolls into the chute 22 and is discharged from said chute at one side of the machine. The seed from which the cotton is fully separated passes through grates or screens 33 into underlying longitudinal gutters or channels 34 in which are arranged screw conveyers 35 carried by shafts 36, which operate to discharge the seed at the rear of the frame. As shown, the gutters 34 communicate with discharge openings 37 formed in the rear wall of the casing, and the shafts 36 are journaled at their forward ends in the front wall of the casing and at their rear ends extend through the openings 37 and are journaled in suitable supporting brackets 38. The seed from which the lint has not been completely removed are retained by the screens 33 until, through the agitation of the superimposed knocker rolls, the lint is completely freed therefrom, whereupon the seed are free to drop into the underlying gutter 34 for discharge by the screw conveyer. Each screen 33 is transversely of segmental form and preferably comprises a longitudinal series of bars 39 passing through openings in a central bracket 40 and fitted at their extremities in apertures in end brackets 41 having flanges 42 bolted or riveted to the front and rear walls of the frame. The central bracket is retained in position by the rod, and all the brackets rest upon the V-shaped upper edge of a supporting bar 43 extending longitudinally within the gutter 34 and removably seated at its ends in receiving recesses 45 in said front and rear walls, whereby the parts may be readily applied and removed as occasion requires in the operation of the machine. The side walls of the hopper 2 are provided at their lower ends with hinged or pivoted doors 46 resting upon supporting beams 47 and adapted to be swung upwardly to open position to admit access to the feed passages and parts of the ginning devices in order to permit ready repairs and the removal of excess material in the event of chokage of any of the parts.

The means for driving the various working parts of the machine comprises the main drive shaft 48 carrying a main drive pulley 49 adapted to receive motion from any suitable source of power. The shaft 48 also carries at its forward end a pulley 50 around which passes a drive belt 51 passing over pulleys 52 and 53 on the forward ends of the shafts 10 and 11, whereby the ginning roll of one set of ginning devices and the knocker roll of the other set of ginning devices are driven. Between the pulleys 52 and 53 a portion of the belt 51 depends in the form of a loop and passes around an idler or belt-tightening pulley 54 carried by a bracket plate 55 slidably mounted between the adjacent guide flanges 24 and adjustable by means of a screw 56, whereby the belt may be conveniently tightened or loosened. The forward end of the shaft 48 also carries a sprocket wheel 57 connected by a chain 58 with a sprocket wheel 59 on a countershaft 60 journaled at one side of the machine. On the shaft 60 is also a sprocket wheel 61 connected by a chain 62 with a sprocket wheel 63 on the shaft 36 of the adjacent screw conveyer 35, whereby said conveyer is driven. The front ends of the shafts of the two conveyers are provided with sprocket wheels 64 and 65 connected by a chain 66, coupling said screw conveyers for driving motion in unison. Between the end walls of the frame, the shaft 48 carries a gear 67 which meshes with a gear 68 on a parallel longitudinal transmission shaft 69, extending at its rear end beyond the rear wall of the frame and provided with a belt wheel or pulley 70. Passing around this belt wheel or pulley 70 is a belt 71 which also passes around pulleys 72 and 73 on the rear ends of the shafts 9 and 14 of the ginning roll 7 and tappet or knocker roll 12, by which such rolls are driven, the belt having a looped portion depending from the pulleys 72 and 73 and passing around a belt tightener or idler 74 carried by a bracket plate 75 slidably mounted between the guide flanges 24 on the rear wall of the frame and adjustable by means of a screw 75, whereby the said belt may be tightened or loosened, the construction in this respect being a duplicate of the belt 51 at the front of the machine. By means of this construction of drive gearing, the parts of the ginning mechanism will be driven at regulated rates of speed and the elements of the driving mechanism are arranged in a compact manner so as to be readily accessible for removal, repairs and adjustment whenever necessary.

From the foregoing description, the construction and mode of operation of my improved gin will be apparent, and it will be seen that the construction is such as to secure a compact arrangement of ginning devices, as well as the separation of the seed from the cotton in such a manner as to avoid the objectionable practice of sawing or combing, the knocker or tappet rolls operating simply with a beating or loosening effect to free the seed from the cotton, by which injury to either the seed or cotton will be avoided with the consequent production of a finer grade of cotton and economy in the operation of the gin in enabling the uncrushed or otherwise uninjured seed to be collected and sold as a commercial product.

Having thus described the invention, what I claim as new, is:—

1. In a cotton gin, the combination of a frame or casing, a hopper provided with downwardly diverging passages, a pair of horizontal, downwardly and outwardly rotating juxtaposed ginning rolls, having their outer surfaces partially exposed in the respective passages, a lint chute common to and disposed beneath said ginning rolls, vertically disposed doctor blades having their upper edges bearing against the outer sides of the respective rolls, inwardly and downwardly rotating knocker rolls disposed within said passages opposite the exposed faces of the ginning rolls and provided with teeth operating in paths parallel with the acting edges of the doctor blades, and means for driving the rolls.

2. In a cotton gin, the combination of a frame or casing, a hopper provided with downwardly diverging passages, a pair of horizontal, parallel juxtaposed downwardly and outwardly rotating ginning rolls having their outer portions exposed in said passages, a lint chute common to and arranged beneath said ginning rolls, vertically disposed doctor blades having their upper edges arranged to bear against the outer faces of the respective ginning rolls, downwardly and inwardly rotating knocker rolls arranged on the outer sides of the ginning rolls within said passages and provided with teeth operating in paths parallel with the acting edges of the doctor blades, a driving shaft, gearing for operating the ginning roll of one set and the knocker roll of the other set from said drive shaft, and separate and independent gearing for operating the other ginning roll and knocker roll from said shaft.

3. In a cotton gin, a ginning chamber having a feed inlet and side walls inclining downwardly and outwardly in diverging relation therefrom, a central inverted V-shaped deflector disposed in said chamber with its sides parallel with said walls and forming therewith diverging feed passages, a pair of outwardly and downwardly rotating juxtaposed ginning rolls disposed partially beneath the deflector and having portions exposed in the respective passages, doctor blades on the outer sides of said ginning rolls, knocker rolls arranged at the lower ends of the passages with their axes parallel with and in the horizontal plane of said ginning rolls, said knocker rolls being provided with longitudinal rows of teeth for coöperation with the doctor blades and ginning rolls, and doors at the lower ends of the diverging walls of the ginning chamber adapted to be opened to afford access to the lower end of the passages and to directly expose the rolls.

4. In a cotton gin, the combination of a frame or casing, a hopper provided with downwardly diverging passages, horizontal, parallel downwardly and outwardly rotating juxtaposed ginning rolls having their outer faces exposed in said passages, a lint chute common to and arranged beneath said rolls and provided with resilient walls, vertically disposed doctor blades having their upper edges arranged to bear respectively against the outer faces of the respective ginning rolls, said blades being mounted to rock on axes for lateral adjustment toward and from the rolls, means connecting said shafts with the resilient walls of the chute for normally holding said doctor blades away from the ginning rolls, means for adjusting said doctor blades on their axes for regulating their bearing pressure on the rolls, downwardly and inwardly rotating knocker rolls arranged on the outer sides of said ginning rolls within said passages and provided with teeth operating in paths parallel with the acting edges of the doctor blades, and means for driving the rolls.

5. In a cotton gin, the combination of a frame or casing, a hopper superposed thereon and provided with an inlet, said hopper having downwardly diverging side walls, a deflector disposed within said hopper below said inlet and having downwardly diverging sides coöperating with the side walls of the hopper to provide correspondingly diverging passages, horizontal, parallel downwardly and outwardly rotating ginning rolls disposed partially beneath said deflector and projecting partially into said passages, vertically disposed doctor blades supported beneath said rolls and having their upper edges arranged to bear against the respective outer faces thereof, downwardly and inwardly rotating knocker rolls arranged in said passages opposite the exposed portions of the ginning rolls and provided with teeth operating in paths parallel with the acting edge of the doctor blade, and means for driving the rolls.

6. In a cotton gin, the combination of a frame or casing, a hopper superposed thereon and provided with an inlet and downwardly diverging side walls, a deflector arranged within the hopper beneath the inlet and provided with correspondingly inclined side walls forming with the walls of the hopper downwardly diverging feed passages, horizontal parallel downwardly and outwardly rotating juxtaposed ginning rolls arranged partially beneath the deflector and having their outer surfaces projecting partially into said feed passages, a lint chute common to and arranged beneath said rolls, vertically disposed doctor blades supported beneath the rolls and having their upper edges arranged to bear against the outer exposed faces of the rolls, downwardly and inwardly rotating knocker rolls arranged in the passages opposite the outer faces of the ginning rolls and provided with teeth operating in paths parallel with the acting edges of the doctor blades, means for driving said rolls, and doors at the sides of the hopper adjacent to said knocker rolls and adapted to be opened to permit access to said rolls and to said feed passages.

7. In a cotton gin, a ginning roll, a coöperating knocker roll, a vertically disposed resilient doctor blade having an acting edge bearing against the working surface of the ginning roll, a rock shaft carrying said blade, an abutment on the machine frame, a resilient element connected with said shaft to normally turn the same in a direction to hold the blade away from the ginning roll, a crank arm connected with the shaft, and an adjustable screw carried by the arm to engage said abutment, whereby the shaft may be adjusted in the opposite direction and against the action of said resilient element to regulate the working pressure of the blade.

8. In a cotton gin, the combination of a frame or casing a feed hopper thereon provided with an inlet and having diverging side walls, a deflector disposed within said hopper and provided with diverging side walls, forming with the side walls of the hopper downwardly diverging feed passages, a pair of horizontal parallel downwardly and outwardly rotating ginning rolls disposed partially beneath said deflector and projecting at their outer sides into said passages, a lint chute arranged below said ginning rolls and provided with resilient walls, rock shafts having projections engaging said walls, a pair of vertically disposed doctor blades supported by the rock shafts and bearing at their upper edges against the acting faces of the rolls, said blades being movable away from the rolls by the pressure of the resilient portions of the chute upon the projections of the shafts, means acting upon the rock shafts for regulating the working pressure of the blades, downwardly and inwardly rotating knocker rolls arranged within the passages opposite the outer faces of the ginning rolls and provided with teeth operating in paths parallel with the acting edges of the blades, and means for driving the rolls.

9. In a cotton gin, a horizontal ginning roller, a coöperating toothed knocker roll, a rock shaft, a vertically disposed resilient doctor blade carried by said shaft and bearing against one of the side faces of the roll, a resilient element for holding the blade pressed away from the roll, and means for adjusting said shaft to move the blade inwardly relative to the face of the roll, whereby to regulate its resilient pressure on said roll.

10. In a cotton gin, a horizontal ginning roller, a coöperating horizontal toothed knocker roll, a horizontal rock shaft arranged below the plane of said rolls, a resilient vertically disposed doctor blade carried by said shaft and bearing against one of the vertical faces of the roll, a resilient element acting on said rock shaft to press the blade away from the roll, said blade being movable in an arcuate path in a direction substantially at right angles to the face of the roll, and adjustable means acting on the shaft for regulating the working pressure of the blade on the roll.

11. In a cotton gin, a pair of juxtaposed ginning rolls, a lint chute disposed beneath the ginning rolls and embodying resilient walls, rock shafts provided with slotted upper and lower projections, said slotted lower projections receiving and engaging said resilient walls of the lint chute, doctor blades bearing on the ginning rolls and seated in the slotted upper projections of the rock shafts, the pressure of said resilient chute walls on said slotted lower projections acting to move the blades away from the rolls, means for operating the rolls, and means for adjusting the rock shafts inwardly to regulate the pressure of the doctor blades on the ginning rolls.

12. A cotton gin comprising a frame, a hopper at the upper end of the frame, an inverted V-shaped deflector having downwardly diverging side walls parallel with the side walls of the hopper and forming downwardly diverging passages, a pair of outwardly and downwardly rotating ginning rolls having their axes arranged beneath and in vertical alinement with the lower ends of the side walls of the deflector and a portion of their peripheries exposed in said passages, doctor blades bearing upon the exposed surfaces of the rolls below the horizontal centers thereof, inwardly and downwardly rotating knocker rolls disposed in the bases of the passages with their axes in parallel relation to and horizontal alinement with the axes of the ginning rolls, said knocker rolls being provided with longitudinal rows or teeth movable in pairs parallel with the edges of the doctor blades, a lint chute disposed beneath the ginning rolls, gutters disposed beneath the knocker rolls, screens within the gutters beneath the knocker rolls, conveyers within the gutters, and means for operating the rolls and conveyers.

In testimony whereof I affix my signature in presence of two witnesses.

SYLVANUS D. SHEPPERD.

Witnesses:
E. S. WRIGHT,
GEORGE M. BROOKS.

---

Copies of this patent may be obtained for five cents each, by addressing the "Commissioner of Patents, Washington, D. C."